UNITED STATES PATENT OFFICE.

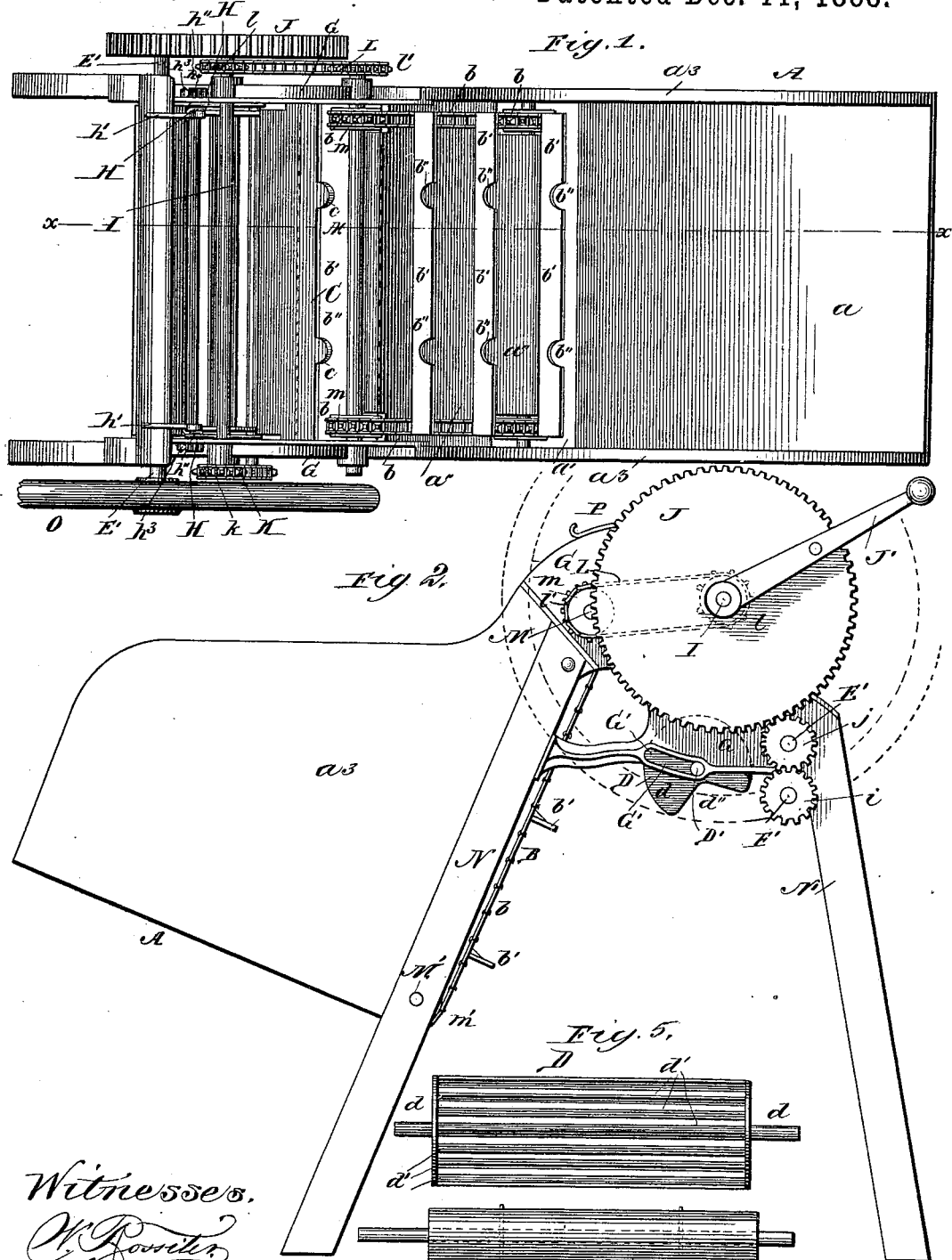

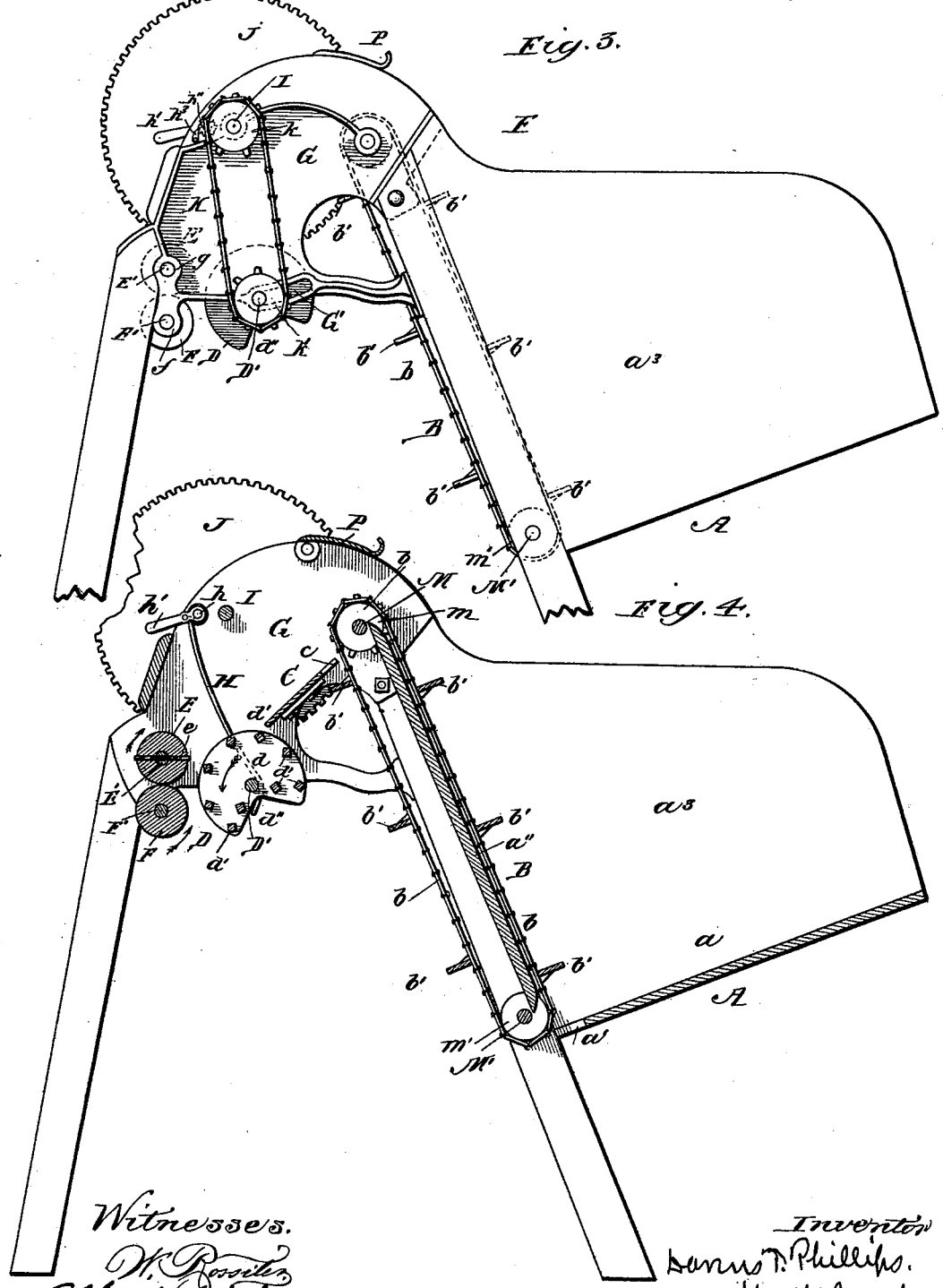

DARIUS T. PHILLIPS, OF CHICAGO, ILLINOIS.

CORN-HUSKER.

SPECIFICATION forming part of Letters Patent No. 394,504, dated December 11, 1888.

Application filed May 16, 1887. Serial No. 238,367. (No model.)

*To all whom it may concern:*

Be it known that I, DARIUS T. PHILLIPS, residing at Chicago, in the county of Cook and State of Illinois, and a citizen of the United States, have invented a new and useful Improvement in Corn-Huskers, of which the following is a specification, reference being had to the accompanying drawings, in which—

Figure 1 is a plan view of a corn-husking machine embodying my invention. Fig. 2 is a side elevation of the same. Fig. 3 is a side elevation of the same from the side opposite that shown in Fig. 2. Fig. 4 is a vertical longitudinal section of the machine, taken on the line $x$ $x$ of Fig. 1; Fig. 5, a detail in elevation of the feeding, husking, and discharging cylinder; Fig. 6, a detail in elevation of one of the rollers.

This invention has for its object to construct a machine by which corn can be cleanly and expeditiously husked, and which will perform the work of carrying, feeding, and husking the corn in a perfect and reliable manner; and it consists in the several parts and combinations of parts, hereinafter described, and pointed out in the claims.

In the drawings, A represents a hopper consisting of a bottom, $a$, having at its inner end a slot or opening, $a'$, a back, $a''$, and side piece, $a^3$.

B is a carrier formed of two chains, $b$, one at each end, with cross-slats $b'$, running from chain to chain and secured to the chains in any suitable manner, and, as shown, each slat at its outer edge is provided with a notch, $b''$, near each end, for a purpose hereinafter explained.

C is a guide-board located below the upper or delivery end of the carrier B, and having on the edge adjacent to the carrier tongues $c$, corresponding in form and location to the notches $b''$ in the slats $b'$, which tongues form guards to prevent the ears from dropping through between the carrier B and guide-board C without locating the entire length of the guide-board in close proximity to the carrier, and also permitting the slats to pass in the movement of the carrier. The slats $b'$ are located at a distance apart that will prevent ears of corn of the ordinary length from being carried endwise and delivered in that position to the guide-board, as such delivery would interfere with the operation of the machine.

D is a cylinder formed of two end disks, $d$, with a cut-away portion to form a depression, $d''$, and cross-bars $d'$, running from disk to disk, secured thereto, near the periphery of and following the contour of the disks, the bars at the cut-away portion forming a corresponding depression in the cylinder. This cylinder receives the unhusked ears of corn from the guide-board C and feeds them to the husking device, of which it forms one element, and by reason of its depression also furnishes the means for discharging the husked ears. The cylinder D is mounted upon a shaft, $D'$.

E is a husking-roller, formed of india-rubber, mounted upon the shaft $E'$, and having a series of pins, $e$, passing through it and the shaft, near each end thereof. These pins project but very little beyond the periphery of the roller, and in practice it is found that they can be flush, or nearly so, with the roller-surface. The object of these pins is simply to engage the husk and break it slightly, so that the rollers can take hold of it readily.

F is also a husking-roller, formed of india-rubber, mounted on a shaft, $F'$, and having its periphery plain. This roller F runs in contact with the roller E. Both rollers E F are so located as to leave a space between their peripheries and the cylinder D for the entrance and discharge of the ears of corn.

G are plates, one for each end of the machine, and each plate having on its lower side a slot, $G'$, to receive the end of the shaft $D'$, thereby forming bearings therefor. By means of these slots $G'$ the cylinder D is free to yield to accommodate ears of different sizes. Each plate G, at one corner, is provided with a bearing, $f$, for the shaft $F'$, and a bearing, $g$, for the shaft $E'$, as shown in Fig. 3, and to these plates the shelf or guide C is secured at its ends in any suitable manner.

On the inner sides of the plates G are supported springs H, which extend down and pass back of the shaft $D'$ and furnish the means for holding the cylinder D in proper relation to the rollers E F, to perform the husking operation and allow the cylinder to yield for the size of ears. Each spring H, at the upper end, is provided with a coil, which encircles a pin, $h$, loosely mounted in the side plates, G, and to which is secured a handle, $h'$, into which the coiled end of the spring is inserted, and the other end of the pin $h$ has secured thereto a ratchet-wheel, $h''$, with which a dog, $h^3$, engages. The pin $h$ is free to be turned by means of the handle $h'$, whereby the tension of the spring H, and the consequent resistance thereof to the lateral movement of the cylinder, may be increased or decreased at pleasure.

I is a shaft running from end plate to end plate G, and having its bearings in such plates with its ends projecting beyond the plates, for a purpose hereinafter explained.

J is a wheel secured to one end of the shaft I, and having attached thereto and to the shaft I a handle, $J'$, by means of which the shaft and wheel can be rotated either by hand or otherwise. The wheel J meshes with a pinion, $j$, on the end of the shaft $E'$, driving the roller E, and the pinion $j$ also meshes with a pinion, $i$, on the end of the shaft $F'$, for driving the roller F; and as these pinions $i\,j$ are of the same diameter the rollers E F will have the same speed, but in opposite directions, and as the wheel J is of a larger diameter than the pinions the speed of the rollers will be greater than that of the wheel.

K is a drive-chain running over a sprocket-wheel, $k$, on the shaft I and a sprocket-wheel, $k'$, on the shaft $D'$, for driving said shaft $D'$ from the shaft I and imparting rotation to the cylinder D at a less speed than the rollers E F, as will be readily understood.

L is a drive-chain running over a sprocket-wheel, $l$, on the shaft I, adjacent to the wheel J, and a sprocket-wheel, $l'$, on the shaft, which carries the sprocket-wheels of the chains $b$.

M is the shaft for the upper end of the carrier B, and on which are the sprocket-wheels $m$, receiving rotation from the drive-chain L. The chains $b$ run over the sprocket-wheels $m$ of the shaft M and over sprocket-wheels $m'$ on a shaft, $M'$, and as the sprocket-wheels $l\,l'$ correspond in size to the sprocket-wheels $k\,k'$ the speed of the carrier B will correspond with that of the cylinder D. The length of the carrier B and the diameter of the cylinder D, together with the distance apart of the slats $b$ and the location of the shelf or guide-board C, should be such that as a slat $b'$ comes to the upper end of the carrier with an ear of corn thereon the cylinder D is in position to feed the ear just previously discharged by the carrier into the husking device to be operated upon and to remove by its continued rotation the ear which has been husked, by which means the machine will be kept clear and one ear will not be discharged from the carrier until the previously-received ear is in position to be fed to the husking device by the cylinder D.

N are legs attached to the plates G and supporting the hopper A and the shaft $M'$, in the form of construction shown, and $N'$ are legs attached to the opposite side or end of the plates G and forming, with the legs N, the support of the machine.

O is a balance or fly wheel on the shaft $E'$.

P is a guard mounted on the end plates, G, by suitable pins or pivots and located in line with the carrier B, against which the ears of corn will strike, if carried up endwise, to be tipped back into the hopper.

The operation is as follows: The hopper A is to be filled with corn unhusked and the machine started by the crank $J'$, or otherwise, which rotates the wheel J and shaft I, and through the chain L and sprocket-wheels $l\,l'$ drives the shaft M to operate the carrier B, and at the same time, through the chain K and sprocket-wheels $k\,k'$, the cylinder D is driven, and from the rotation of the wheel J the pinions $i\,j$ are driven to rotate the rollers E F. The carrier B, as it is carried around from the rotation of the shaft M, brings the slats $b'$ in succession around and through the slot $a'$ to receive an ear of corn from the hopper A, and the ear caught by each slat will be carried up and delivered from the upper end of the carrier onto the shelf or guide-board C, to pass therefrom onto the cylinder D in the space between two of the bars $d'$, and by this cylinder the ear is carried around, to pass between the cylinder D and the husking-roller E into the space between the cylinder and the husking-rollers E F, where it is held by the reverse rotation of the roller F to that of the roller E and cylinder D, and while thus held through the action of the rollers and the cylinder the husks will be stripped therefrom. The springs H furnish the required amount of pressure for the cylinder to perform the husking operation. The husks stripped from the ear will pass between the rollers E F, to be discharged outside of such rollers, and the husked ear will remain in the space where it was husked until the cylinder D has made one complete revolution, when it will enter the depression $d''$ in the cylinder and be carried thereby out from the husking-space, to drop from the depression into a basket or other receptacle located beneath the cylinder, and at the same time that the husked ear is carried from the husking-space another ear is entered therein by the cylinder D, and as this ear is ready to enter another ear has been carried up by the carrier B, to be delivered onto the shelf or guide-board C; and it will thus be seen that the operation of carrying the ears from the hopper, feeding them to the husking device, and discharging them after being husked is a continuous one, and can be continued until the hopper is emptied and again refilled, and so on until the entire husking is completed.

The notches $b''$ in the slats $b'$, in connection with the tongues $c$, enable the carrier and the shelf or guide-board to be located in close proximity one to the other, so as to insure the delivery of the ears from the carrier onto the shelf without any liability of their falling through between the carrier and shelf, and the location of the slats at a less distance apart than the length of an ordinary ear prevents the ears from being carried up otherwise than sidewise, as an ear if caught by the shelf endwise will be in contact at its upper end with the slat above that on which it is being carried, causing the ear as the carrier moves upward to fall back into the hopper, and in case the ear is caught and raised endwise its upper end will come in contact with the guard P, and such guard will rise slightly, thereby giving the ear a backward tip, by which it will fall again into the hopper.

The bars $d'$ of the cylinder D furnish a lodgment for the ears, and at the same time hold them so as to feed them into the husking-place, as such bars form a guard against the backward carrying of the ears or their slipping out when entering between the cylinder and the roller. The cylinder D and the rollers E F, formed of rubber, present a contact-surface that will take hold of the husks, and at the same time form a yielding surface that will not shell the corn, and in case the pressure of the cylinder is too great and will not husk without shelling, such pressure can be reduced by relieving the tension of the springs H by unwinding their coils, and in case of an insufficient pressure for husking purposes the pressure can be increased by winding up the coils of the springs; and these springs also allow of the necessary yield of the cylinder for ears of different sizes.

The cylinder D acts on the ear to turn it in the husking-place, so that the husking operation is not at one point on the ear.

What I claim as new, and desire to secure by Letters Patent, is—

1. The cylinder D, having the bars $d'$, in combination with the roller E, having the pins $e$, and the roller F, substantially as and for the purposes specified.

2. The combination of the husking-rollers E F, the plates G, provided with slots G′, the shaft D′, mounted in said slots, the cylinder D, consisting of notched or cut-away plates $d$, secured on said shaft, and bars $d'$, arranged to conform to the contour of said plates $d$, and the springs H, for regulating the pressure and permitting the yield of said cylinder, substantially as described.

3. The combination, with a husking device, of the cylinder D, having bars $d'$, and depression $d''$, for receiving and carrying unhusked corn to the husking-point and delivering the corn after it is husked, substantially as described.

4. The combination, with the husking-rollers E F, placed one above the other, of the cylinder D, having bars $d'$, and depression $d''$, substantially as described.

5. The combination of the husking-rollers E F, placed one above the other, the yielding cylinder D, for receiving, carrying, and discharging the corn, and the springs H, for regulating the pressure and permitting the yield of said cylinder, substantially as described.

6. The combination, with the hopper A, carrier B, and end plates, G, of the guard P, mounted on the end plates above the carrier to prevent endwise delivery of the corn, substantially as described.

7. The combination of the hopper A, end plates, G, guide-board C, having tongues $c$, and the carrier B, having slats $b'$, provided with notches $b''$ to clear the tongues $c$ and permit the carrier and guide-board to be located in close relation, substantially as described.

8. The combination, with the hopper A, carrier B, and guide-board C, of the yielding cylinder D and the husking-rollers E F, substantially as described.

DARIUS T. PHILLIPS.

Witnesses:
HARRY T. JONES,
ALBERT H. ADAMS.